July 17, 1928.
W. E. CRAIN
SCREW FOR CENTER BEARINGS FOR LOOMS
Filed Feb. 27, 1926
1,677,549
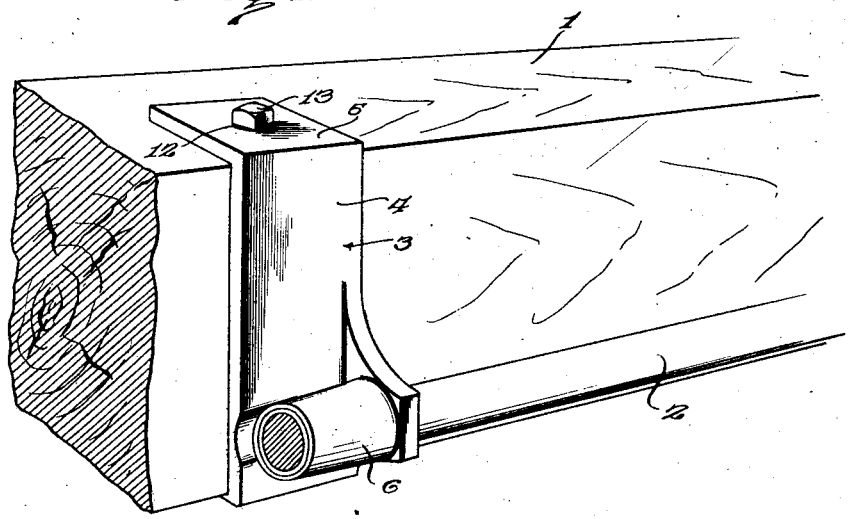
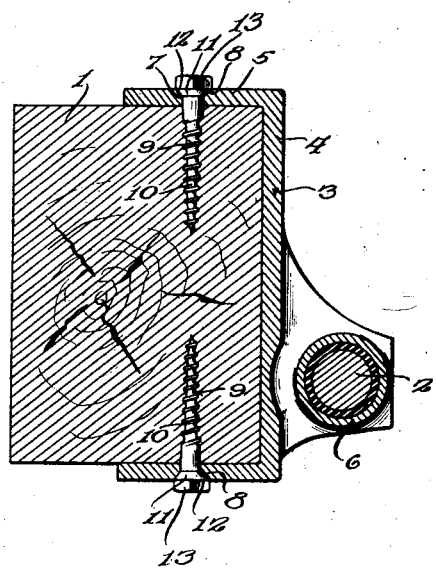
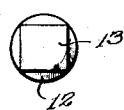
Inventor
W. E. Crain
By Lacey & Lacey, Attorneys Patented July 17, 1928.

1,677,549

UNITED STATES PATENT OFFICE.

WILLIAM E. CRAIN, OF GREENVILLE, SOUTH CAROLINA, ASSIGNOR TO WILLIAM H. BAHAN, OF GREENVILLE, SOUTH CAROLINA.

SCREW FOR CENTER BEARINGS FOR LOOMS.

Application filed February 27, 1926. Serial No. 91,169.

It is a well known fact that great difficulty is experienced in tightening center bearings for the protector rods of looms when they become loose, inasmuch as ordinary screws are employed for securing the bearing to the lay, and if these screws become loose, the loom fixer is compelled to stop the operation of the loom, loosen the cloth and pull the same out of the way, and then endeavor to tighten the loose screw by the use of a screw driver. The location of the bearing is such that the screw driver, if of sufficient size to tighten the screw, must be held at an angle so that the bit of the screw driver does not completely engage in the slot in the head of the screw and as a result, one side of the screw head frequently becomes broken off or the walls of the slot become so distorted that the screw can not be tightened. Therefore, the present invention has as its object to provide, in combination with the center bearing of a loom, a novel type of screw for securing the bearing to the lay and which screw may be tightened without the employment of a screw driver but, on the other hand, by the use of a wrench, which, by reason of the position it will occupy when applied to the head of the screw, can be conveniently employed by the loom fixer without the inconvenience referred to above.

In the accompanying drawings:

Figure 1 is a perspective view illustrating the application of the screw to the center bearing.

Figure 2 is a vertical front to rear sectional view illustrating the application of the screw.

Figure 3 is a detail plan view of the upper end of the screw.

In the drawing, the numeral 1 indicates the lay, the numeral 2 the protector rod, and the numeral 3 the bearing. This bearing comprises a plate 4 provided with attaching portions 5, and the bearing is applied to the lay as shown. The plate 4 is provided with a bearing 6 in which the rod 2 is mounted. The portions 5 are each provided with an opening 7 having its outer porton flared to provide a countersink indicated by the numeral 8, and heretofore it has been customary to employ flatheaded wood screws of the ordinary type for securing the bearing in place, the screws being, of course, threaded into the lay 1 through the said openings 7. However, as previously explained, great difficulty has been experienced in tightening the screws when they become loose, inasmuch as they are so located as to be practically inaccessible by the use of an ordinary screw driver.

In accordance with the invention, the screw, which is indicated in general by the numeral 9, has the usual threaded shank 10 of the character peculiar to wood screws, and is provided with a circular head 11 which is circumferentially conical to fit the countersink 8 and which has a flat upper face 12 upon which there is integrally formed a head 13 which is square or of other polygonal form, adapting it for the application thereto of a wrench. It will now be evident that when the screw is driven into the lay 1, the head 11 thereof will be received flush within the countersink 8 and the squared or polygonal head 13 will project sufficiently far beyond the surface of the portion 5 of the bearing through which the screw is threaded, to permit of the application to said head of a wrench for the purpose of tightening the screw. As a consequence, a loom fixer may readily tighten the securing screws for the bearing by the use of an ordinary wrench and without any likelihood of damaging the screws and necessitating dismounting of the lay. Furthermore, screws of the type disclosed may be more readily tightened than those requiring the use of a screw driver.

It will be observed that the diameter of the upper side of the head 11 of the screw is not less than the major transverse diameter of the head 13, so that segmental portions of the flat upper side 12 of the head 11 project beyond each face of the head 13 with the result that when a wrench is applied to the head 13 it can not accidentally slip downwardly onto the shank of the screw and become disengaged from the said head 13, and this is of great advantage when it is considered that the screws which secure the bearing in place are so located as to be nearly inaccessible, and in a position where the loom fixer cannot visually determine whether or not the wrench is engaged with the head 13 of the screw, but must depend upon his sense of touch.

Having thus described the invention, what I claim is:

The combination with a loom lay and a lay center bearing fitting against the lay and having attaching portions overlapping opposed faces of the lay and formed with fastener receiving openings, each opening having its outer portion flared to provide a countersink, of screws for securing said bearing to the lay each comprising a threaded shank having a conical head and a polygonal head integrally formed thereon and projecting from the conical head, the said screw being engageable through a fastener receiving opening and adapted to have its conical head received within the countersink of the opening with the polygonal head projecting beyond the surface of the attaching portion, the outer end of the conical head of the screw being circular and of a diameter not less than the maximum transverse dimension of the polygonal head whereby segmental portions of the outer end of the said conical head will project beyond the side faces of the polygonal head to constitute abutments for a wrench applied to the polygonal head and prevent disengagement of the wrench therefrom.

In testimony whereof I affix my signature.

WILLIAM E. CRAIN. [L. S.]